United States Patent
Blok et al.

(10) Patent No.: US 10,538,606 B2
(45) Date of Patent: Jan. 21, 2020

(54) FUNCTIONALIZED RESINS FOR HIGH PERFORMANCE TIRES

(71) Applicant: ExxonMobil Chemical Patents Inc., Baytown, TX (US)

(72) Inventors: Edward J. Blok, Huffman, TX (US); Ian C. Stewart, Houston, TX (US); Anthony J. Dias, Houston, TX (US); Yuan-Ju Chen, Houston, TX (US)

(73) Assignee: ExxonMobil Chemical Paents Inc., Baytown, TX (US)

( * ) Notice: Subject to any disclaimer, the term of this patent is extended or adjusted under 35 U.S.C. 154(b) by 60 days.

(21) Appl. No.: 15/035,059

(22) PCT Filed: Aug. 11, 2014

(86) PCT No.: PCT/US2014/050475
§ 371 (c)(1),
(2) Date: May 6, 2016

(87) PCT Pub. No.: WO2015/084436
PCT Pub. Date: Jun. 11, 2015

(65) Prior Publication Data
US 2016/0289352 A1 Oct. 6, 2016

Related U.S. Application Data

(60) Provisional application No. 61/912,115, filed on Dec. 5, 2013.

(30) Foreign Application Priority Data

Feb. 19, 2014 (EP) .................... 14155670

(51) Int. Cl.
*C08F 132/08* (2006.01)
*C08L 9/06* (2006.01)

(52) U.S. Cl.
CPC .............. *C08F 132/08* (2013.01); *C08L 9/06* (2013.01)

(58) Field of Classification Search
CPC ........ C08F 132/08; B60C 1/0016; C08L 9/06; C08L 9/00; C08K 5/5425
USPC ....................................... 523/156
See application file for complete search history.

(56) References Cited

U.S. PATENT DOCUMENTS

| | | | |
|---|---|---|---|
| 6,201,059 B1 | 3/2001 | Wideman et al. | |
| 6,228,944 B1 | 5/2001 | Blok et al. | |
| 6,300,449 B2 | 10/2001 | Wideman et al. | |
| 6,436,476 B1 | 8/2002 | Sage, Jr. | |
| 6,844,409 B2 | 1/2005 | Angeletakis et al. | |
| 8,735,500 B2 | 5/2014 | Barbee et al. | |
| 2006/0173145 A1 | 8/2006 | Pawlow et al. | |
| 2009/0104429 A1 | 4/2009 | Goto et al. | |
| 2010/0113703 A1 | 5/2010 | Houjo et al. | |
| 2012/0058275 A1 | 3/2012 | Giardello et al. | |
| 2013/0211027 A1* | 8/2013 | Barbee ................ | C08F 232/06 526/283 |
| 2013/0296475 A1 | 11/2013 | Simon et al. | |
| 2014/0088277 A1 | 3/2014 | Stewart | |
| 2014/0144573 A1 | 5/2014 | Blok et al. | |
| 2016/0002382 A1 | 1/2016 | Tsunogae et al. | |

FOREIGN PATENT DOCUMENTS

| | | |
|---|---|---|
| JP | 2000336152 A | 12/2000 |
| JP | 2005041945 A | 2/2005 |
| JP | 2013075994 A | 4/2013 |
| JP | 2013124341 A | 6/2013 |
| WO | 02/26857 | 4/2002 |
| WO | WO 2012/050667 * | 4/2012 |
| WO | 2013/176712 | 11/2013 |

OTHER PUBLICATIONS

Cui et al., "*Glass fiber reinforced ROMP-based Bio-renewable polymers: Enhancement of the interface with silane coupling agents*," Composites Science and Technology, 2012, vol. 72, pp. 1264-1272.

* cited by examiner

*Primary Examiner* — Doris L Lee

(57) ABSTRACT

This invention relates to a dicyclopentadiene (DCPD)-based resin functionalized with groups capable of reacting with silica or carbon black for use in high performance tires and a preferred method of preparing the functionalized resin comprising ruthenium-catalyzed ring-opening cross metathesis. The functionalized resin may comprise the reaction product obtained by contacting a polymer comprising units derived from (DCPD) and a vinyl monomer or vinylene monomer in the presence of a metathesis catalyst, wherein the vinyl monomer or vinylene monomer comprises at least one of the following functional groups: a silyl group, a siloxy group, or an alkoxysilyl group. This invention further relates to a tire tread composition comprising the functionalized resin and which exhibits enhanced durability, traction, handling, and extractability properties.

13 Claims, 1 Drawing Sheet

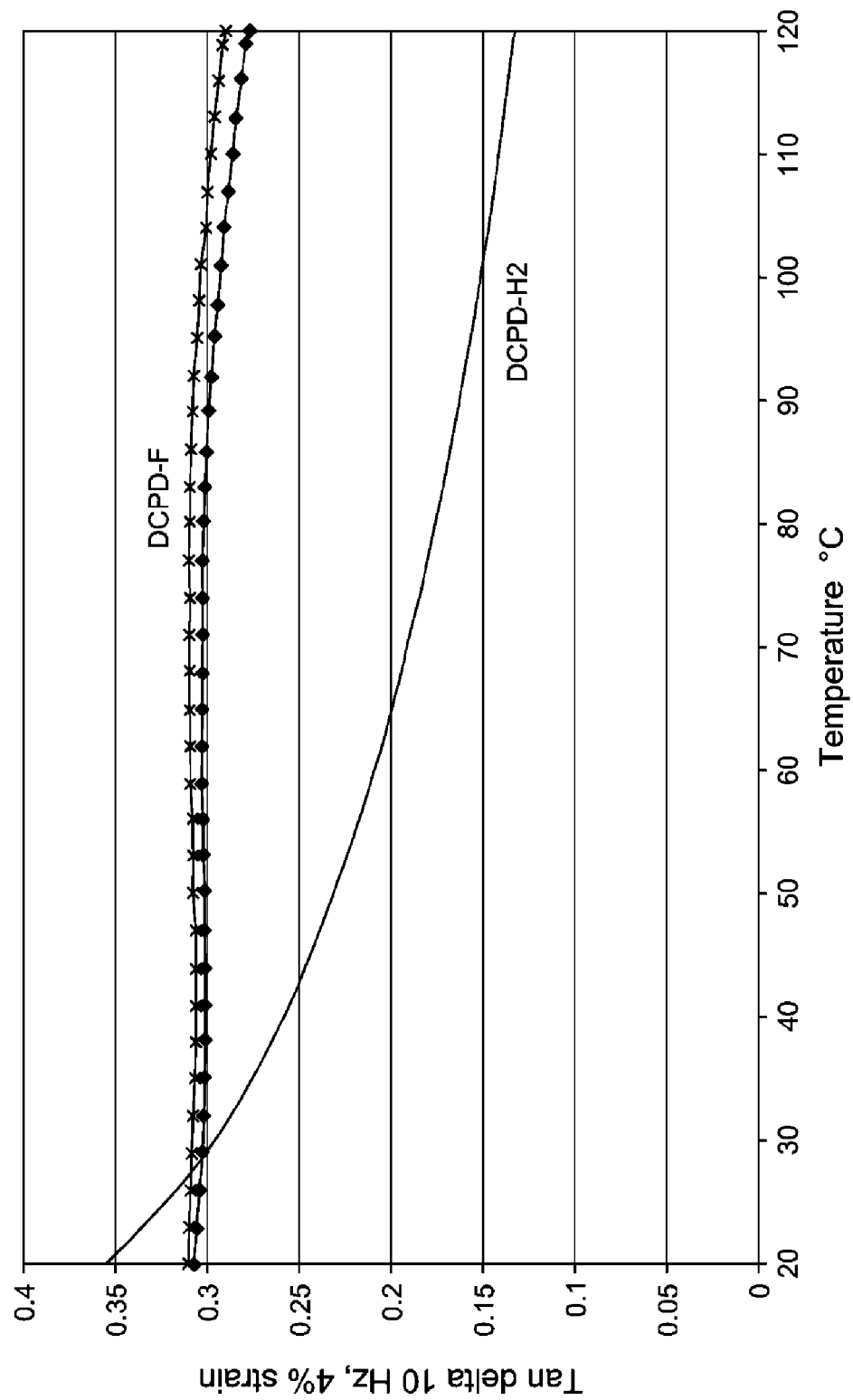

FUNCTIONALIZED RESINS FOR HIGH PERFORMANCE TIRES

PRIORITY

This application is a National Stage Application of International Application No. PCT/US2014/050475, filed Aug. 11, 2014, and claims the benefit of U.S. Application No. 61/912,115, filed Dec. 5, 2013, the disclosures of which are hereby incorporated by reference in their entireties.

FIELD OF THE INVENTION

This invention relates to the metathesis catalyzed functionalization of dicyclopentadiene-based resins for use in high performance tires.

BACKGROUND

Treads of a high performance tire are expected to have outstanding traction and handling properties. Generally, tire treads are compounded with high filler loading and resins to achieve these desired properties.

In passenger tires, miscible resins are typically used to form the treads in order to increase traction. Although these resins increase overall traction, tread compounds formed from these miscible resins tend to suffer from reduced traction and handling at high speeds or at high temperatures during hard driving.

Racecar tires have solved the problems observed in passenger tires at high speeds and temperatures by adding high softening point immiscible resins and resin blends. For instance, it has been observed that using resin packages with high G' (storage modulus) values at high temperatures along with high tangent delta (ratio of loss modulus to storage modulus) values improve tire performance at high speeds and temperatures. However, since adding immiscible resins reduces the life of the tire, using immiscible resins for high performance passenger tires is not a viable option because of the increased stability and lifetime requirements of passenger tires versus those of racecar tires.

The present invention solves the traction and handling problems observed in high performance passenger tires by functionalizing a dicyclopentadiene (DCPD)-based resin with groups capable of reacting with silica or carbon black using ruthenium-catalyzed ring-opening cross metathesis. The functional groups of this resin allow for the formation of a stable immiscible resin system usable for the formation of high performance tire treads which is non-extractable, provides a stable morphology, and exhibits a broad transition using a single resin.

Relevant prior art to the present disclosure includes U.S. Publication No. 2013-0296475; U.S. Ser. No. 13/822,103 filed on Mar. 11, 2013; U.S. Publication No. 2010-0113703 A1; U.S. Pat. No. 6,300,449; U.S. Provisional Application No. 61/705,057 filed on Sep. 24, 2012; U.S. Publication No. 2009-0104429 A1; U.S. Pat. Nos. 6,844,409; 6,436,476; U.S. Publication No. 2012-0058275; and Hongyu Cui & Michael R. Kessler, Glass Fiber Reinforced ROMP-based Bio-renewable Polymers: Enhancement of the Interface with Silane Coupling Agents, COMPOSITES SCIENCE AND TECHNOLOGY, 72, 1264-1272 (2012).

SUMMARY OF THE INVENTION

This invention relates to a functionalized resin composition and a method of producing the composition, wherein the composition comprises a DCPD-based polymer backbone and at least one of the following functional groups:
(i) a silyl group;
(ii) a siloxy group; or
(iii) an alkoxysilyl group.

This invention further relates to the reaction product obtained by contacting a polymer comprising units derived from DCPD and a vinyl monomer or vinylene monomer, wherein the vinyl monomer or vinylene monomer is represented by one of the following formulae (I):

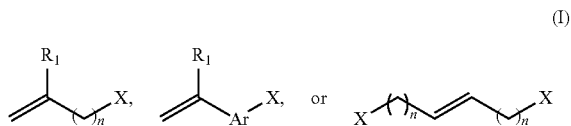

wherein,
each X is, independently, $-SiR_2R_3R_4$, $-O-SiR_2R_3R_4$, or $-Si(OR_2)(OR_3)(OR_4)$;
each $R_2$, $R_3$, and $R_4$ is, independently, a hydrogen, a $C_1$ to $C_{20}$ alkyl group, or an aromatic group;
each $R_1$ is, independently, a hydrogen atom or a $C_1$ to $C_{40}$ alkyl group;
each Ar is, independently, an aromatic group; and
each n is, independently, from 0 to 40.

This invention further relates to a tire tread composition comprising the aforementioned functionalized resin composition.

BRIEF DESCRIPTION OF THE FIGURES

FIG. 1 is a representative depiction of the tangent (tan) delta values at 4% strain of a comparative and an inventive material over a range of temperatures obtained via dynamic mechanical thermal analysis (DMTA). Note that the FIGURE shows the tan delta values, Table 6 comprises normalized data.

DETAILED DESCRIPTION

This invention relates to a metathesis catalyzed reaction product comprising a functionalized dicyclopentadiene-based resin obtained by contacting units derived from dicyclopentadiene and a vinyl monomer or a vinylene monomer comprising a functional group capable of reacting with silica or carbon black. The vinyl or vinylene monomer is represented by one of the following formulae (I):

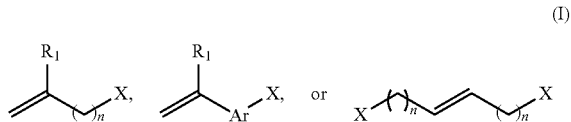

wherein,
each X is, independently, a silyl, siloxy, or alkoxysilyl;
each $R_1$ is, independently, a hydrogen atom or a $C_1$ to $C_{40}$ alkyl group;
each Ar is, independently, an aromatic group; and
each n is, independently, from 0 to 40.

This invention further relates to high performance tire tread compositions comprising the functionalized dicyclopentadiene-based resin and which exhibit improved durability, traction, handling, and extractability properties.

Definitions

The term "PHR" means parts per hundred parts of rubber, and is a measure common in the art wherein components of a composition are measured relative to the total of all of the elastomer (rubber) components. The total PHR or parts for all rubber components, whether one, two, three, or more different rubber components is present in a given recipe is always defined as 100 PHR. All other non-rubber components are ratioed against the 100 parts of rubber and are expressed in PHR.

The term "elastomer," as used herein, refers to any polymer or combination of polymers consistent with the ASTM D1566 definition, incorporated herein by reference. As used herein, the term "elastomer" may be used interchangeably with the term "rubber."

Functionalized Resin

Units Derived from Dicyclopentadiene

The phrase "units derived from dicyclopentadiene" includes units derived from substituted DCPD such as methyl DCPD or dimethyl DCPD.

Preferably, the polymer comprising units derived from dicyclopentadiene (also referred to as the "DCPD polymer") have an Mw within the range from 150 to 10,000 g/mol (as determined by GPC), more preferably from 200 to 5,000 g/mol, most preferably from 300 to 1000 g/mol.

Preferably, the DCPD polymer comprises up to 100 mol % units derived from dicyclopentadiene, more preferably within the range from 5 to 90 mol % units derived from DCPD, most preferably from 5 to 70 mol % units derived from DCPD.

Preferably, the DCPD polymer is made from a monomer mixture comprising up to 15% piperylene components, up to 15% isoprene components, up to 15% amylene components, up to 20% indene components, within the range from 60% to 100% cyclic components, and up to 20% styrenic components by weight of the monomers in the monomer mix.

Cyclic components are generally a distillate cut or synthetic mixture of $C_5$ and $C_6$ to $C_{15}$ cyclic olefins, diolefins, and dimers, co-dimers and trimers, etc., from a distillate cut. Cyclics include, but are not limited to, cyclopentene, cyclopentadiene, DCPD, cyclohexene, 1,3-cyclohexadiene, and 1,4-cyclohexadiene. A preferred cyclic is cyclopentadiene. The DCPD may be in either the endo or exo form. The cyclics may or may not be substituted. Preferred substituted cyclics include cyclopentadienes and DCPD substituted with a $C_1$ to $C_{40}$ linear, branched, or cyclic alkyl group, preferably one or more methyl groups. Preferably, the cyclic components are selected from the group consisting of: cyclopentadiene, cyclopentadiene dimer, cyclopentadiene trimer, cyclopentadiene-$C_5$ co-dimer, cyclopentadiene-piperylene co-dimer, cyclopentadiene-$C_4$ co-dimer, cyclopentadiene-methyl cyclopentadiene co-dimer, methyl cyclopentadiene, methyl cyclopentadiene dimer, and mixtures thereof.

Preferably, the DCPD polymer has a refractive index greater than 1.5. Preferably, the DCPD polymer has a softening point of 80° C. or more (Ring and Ball, as measured by ASTM E-28) more preferably from 80° C. to 150° C., most preferably 100° C. to 150° C.

Preferably, the DCPD polymer has a glass transition temperature (Tg) (as measured by ASTM E 1356 using a TA Instruments model 2920 machine) of from −30° C. to 100° C.

Preferably, the DCPD polymer has a Brookfield Viscosity (ASTM D-3236) measured at the stated temperature (typically from 120° C. to 190° C.) using a Brookfield Thermosel viscometer and a number 27 spindle of 50 to 25,000 mPa·s at 177° C.

Preferably, the DCPD polymer comprises olefinic unsaturation, e.g., at least 1 mol % olefinic hydrogen, based on the total moles of hydrogen in the interpolymer as determined by $^1$H-NMR. Alternatively, the DCPD polymer comprises from 1 to 20 mol % aromatic hydrogen, preferably from 2 to 15 mol % aromatic hydrogen, more preferably from 2 to 10 mol % aromatic hydrogen, preferably at least 8 mol % aromatic hydrogen, based on the total moles of hydrogen in the polymer.

Preferably, the DCPD polymer is the polymer described in WO 2012/050658 A1.

Examples of DCPD polymers useful in this invention include Escorez® 8000 series resins sold by ExxonMobil Chemical Company in Baton Rouge, La. Further examples of DCPD polymers useful in this invention include Arkon® series resins sold by Arakawa Europe in Germany. Yet more examples of DCPD polymers useful in this invention include the Eastotac® series of resins sold by Eastman Chemical Company in Longview, Tex.

Vinyl and Vinylene Monomers

Vinyl and vinylene monomers useful herein include those represented by the formulae (I):

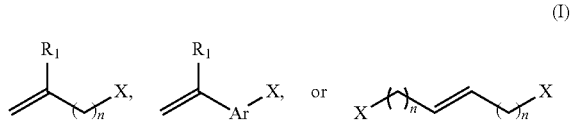

wherein, each $X_1$ is, independently a silyl, siloxy, alkoxysilyl, or a $C_1$ to $C_{20}$ alkyl group, preferably methyl, ethyl, propyl, butyl, pentyl, hexyl, heptyl, octyl, nonyl, decyl, undecyl, dodecyl, tetradecyl, hexadecyl, or octadecyl;

each $R_1$ is, independently, a hydrogen atom or a $C_1$ to $C_{40}$ alkyl group, preferably methyl, ethyl, propyl, butyl, pentyl, hexyl, heptyl, octyl, nonyl, decyl, undecyl, dodecyl, tetradecyl, hexadecyl, or octadecyl;

each Ar is, independently, an aromatic group, preferably phenyl or benzyl; and each n is, independently, from 0 to 40, preferably 1 to 30, preferably 5 to 20.

Preferably, each silyl group has the formula —$SiR_2R_3R_4$, each siloxy group has the formula —O—$SiR_2R_3R_4$, and each alkoxysilyl group has the formula $Si(OR_2)(OR_3)(OR_4)$, wherein, each $R_2$, $R_3$, and $R_4$ is, independently, a hydrogen, a $C_1$ to $C_{20}$ alkyl group, or an aromatic group, preferably methyl, ethyl, propyl, butyl, pentyl, hexyl, heptyl, octyl, nonyl, decyl, undecyl, dodecyl, tetradecyl, hexadecyl, octadecyl, phenyl, or benzyl. In one aspect of the invention, the silyl, siloxy or alkoxysilyl groups comprise an amine, hydroxyl, epoxy, or thiol functional group 3 to 9 carbons away from the silicon atom.

Alkene Metathesis Catalysts

An alkene metathesis catalyst is a compound that catalyzes the reaction between a first olefin (typically vinyl) with a second olefin (typically vinyl or vinylene) to produce a product, typically with the elimination of ethylene.

Preferably, the alkene metathesis catalyst useful herein is represented by the following formula (II):

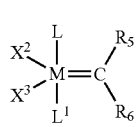

(II)

wherein,

M is a Group 8 metal, preferably Ru or Os, preferably Ru;

$X^2$ and $X^3$ are, independently, any anionic ligand, preferably a halogen (preferably chlorine), an alkoxide or a triflate, or $X^2$ and $X^3$ may be joined to form a dianionic group and may form single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and $X^2$ may be joined to form a multidentate monoanionic group and may form a single ring of up to 30 non-hydrogen atoms or a multinuclear ring system of up to 30 non-hydrogen atoms;

$L^1$ and $X^3$ may be joined to form a multidentate monoanionic group and may form a single ring of up to 30 non-hydrogen atoms or a multinuclear ring system of up to 30 non-hydrogen atoms;

$R_5$ and $R_6$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R_6$ and $L^1$ or $X^3$ may be joined to form a single ring of up to 30 non-hydrogen atoms or a multinuclear ring system of up to 30 non-hydrogen atoms; and $R_5$ and L or $X^2$ may be joined to form a single ring of up to 30 non-hydrogen atoms or a multinuclear ring system of up to 30 non-hydrogen atoms.

Preferred alkoxides include those where the alkyl group is a phenol, substituted phenol (where the phenol may be substituted with up to 1, 2, 3, 4, or 5 $C_1$ to $C_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred triflates are represented by the following formula (III):

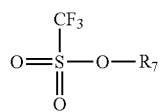

(III)

wherein, $R_7$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the following formulae (IV):

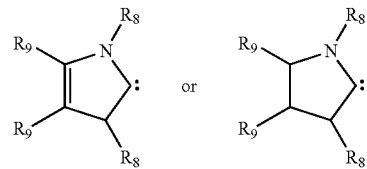

(IV)

wherein, each $R_8$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, tolulyl, chlorophenyl, phenol, substituted phenol, or $CH_2C(CH_3)_3$; and each $R_9$ is hydrogen, a halogen, or a $C_1$ to $C_{12}$ hydrocarbyl group, preferably hydrogen, bromine, chlorine, methyl, ethyl, propyl, butyl, or phenyl.

Alternatively, one of the N groups bound to the carbene in formula (IV) is replaced with an S, O, or P atom, preferably an S atom.

Other useful N-heterocyclic carbenes include the compounds described in Hermann, W. A. Chem. Eur. J., 1996, 2, pp. 772 and 1627; Enders, D. et al., Angew. Chem. Int. Ed., 1995, 34, p. 1021; Alder R. W., Angew. Chem. Int. Ed., 1996, 35, p. 1121; and Bertrand, G. et al., Chem. Rev., 2000, 100, p. 39.

Preferably, the alkene metathesis catalyst is one or more of tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride. More preferably, the catalyst is 1,3-bis(2,4,6-trimethylphenyl)-4,5-dihydroimidazol-2-ylidene[2-(i-propoxy)-5-(N,N-dimethylaminosulfonyephenyl]methyleneruthenium(II) dichloride and/or tricyclohexylphosphine[3-phenyl-1H-inden-1-ylidene][1,3-bis(2,4,6-trimethylphenyl)-4,5-dihydroimidazol-2-ylidene]ruthenium(II) dichloride.

Functionalization Process

The reactants (including the DCPD polymer) are typically combined in a reaction vessel at a temperature of 20° C. to 200° C. (preferably 50° C. to 160° C., preferably 60° C. to 140° C.) and a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Preferably, within the range from 0.00001 to 1.0 moles, more preferably 0.0001 to 0.05 moles, most preferably 0.0005 to 0.01 moles of catalyst are charged to the reactor per mole of DCPD polymer charged.

Preferably, within the range from 0.01 to 10 moles of a vinyl or vinylene monomer, more preferably 0.05 to 5.0 moles, most preferably from 0.5 to 2.0 moles of vinyl or vinylene monomer are charged to the reactor per mole of DCPD polymer charged.

The process is preferably a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_4$ to $C_{10}$ alkanes, chlorobenzene, and aromatic and alkyl-substituted aromatic compounds such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

Alternatively, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Preferably, the feed concentration for the process is 60 vol % solvent or less, more preferably 40 vol % or less, most preferably 20 vol % or less.

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe or pump).

Preferably, the productivity of the process is at least 200 g of functionalized DCPD polymer per mmol of catalyst per hour, preferably at least 5,000 g/mmol/hour, preferably at least 10,000 g/mmol/hr, preferably at least 300,000 g/mmol/hr.

This invention further relates to a process, preferably an in-line process, preferably a continuous process, to produce functionalized DCPD polymers, comprising introducing a DCPD into a reactor and heating the DCPD to polymerize it, obtaining a reactor effluent containing DCPD polymers, optionally removing (such as flashing off) solvent, unused monomer and/or other volatiles, obtaining DCPD polymers, introducing DCPD polymers, vinyl or vinylene monomer and a metathesis catalyst into a reaction zone (such as a reactor, an extruder, a pipe and/or a pump), obtaining a reactor effluent containing functionalized DCPD polymers, optionally removing (such as flashing off) solvent, unused monomer and/or other volatiles, (such as those described herein), and obtaining functionalized DCPD polymers (such as those described herein).

Metathesis products prepared herein can further be hydrogenated after completion or during reaction conditions.

The hydrogenation may be achieved in the presence of any of the known catalysts commonly used for hydrogenating petroleum resins. The catalysts which may be used in the hydrogenation step include the Group 10 metals such as nickel, palladium, ruthenium, rhodium, cobalt, and platinum, and the Group 6 metals such as tungsten, chromium and molybdenum, and the Group 11 metals such as rhenium, manganese, and copper. These metals may be used singularly or in a combination of two or more metals, in the metallic form or in an activated form, and may be used directly or carried on a solid support such as alumina or silica-alumina. A preferred catalyst is one comprising sulfided nickel-tungsten on a gamma-alumina support having a fresh catalyst surface area ranging from 120 to 300 $m^2/g$ and containing from 2% to 10% by weight nickel and from 10% to 25% by weight tungsten as described in U.S. Pat. No. 4,629,766. The hydrogenation is carried out with a hydrogen pressure of 20-300 atmospheres, preferably 150-250 atmospheres.

High Performance Tire Tread Compositions

Preferably, the functionalized DCPD-based polymer produced by this invention can be used to form a high performance tire tread composition.

Preferably, the high performance tire tread composition is formed by blending the functionalized DCPD-based polymer produced by this invention with diene elastomer and inorganic filler. Preferably, the functionalized DCPD-based polymer is present within the range from 5 to 100 PHR, more preferably 15 to 50 PHR, most preferably 20 to 50 PHR. The diene elastomer may comprise a blend of two or more elastomers. The individual elastomer components may be present in various conventional amounts, with the total diene elastomer content in the tire tread composition being expressed as 100 PHR in the formulation. Preferably, the inorganic filler is present within the range from 50 to 150 PHR, more preferably 50 to 100 PHR, most preferably 60 to 90 PHR.

Diene Elastomer

As used herein, the term "diene elastomer" is meant to refer to any viscoelastic polymer synthesized from hydrocarbon monomer comprising two carbon double bonds.

Examples of preferred diene elastomers include, but are not limited to, butyl rubber, halogenated butyl rubber, branched ("star-branched") butyl rubber, halogenated star-branched butyl rubber, poly(isobutylene-co-p-methylstyrene), general purpose rubber, natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof. Blends of these diene elastomers may be reactor blends and/or melt mixes. Particularly preferred diene elastomers include polybutadiene rubber and styrene-butadiene rubber. Preferably, the styrene-butadiene rubber has a styrene content of 25 wt %. A preferred styrene-butadiene rubber is commercially available by Lanxess under the trade name Buna™ VSL 5025-2.

Inorganic Filler

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and typically range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

Coupling Agent

Preferably, the high performance tire tread composition further comprises at least one silane coupling agent. As used herein, the term "coupling agent" is meant to refer to any agent capable of facilitating stable chemical and/or physical interaction between two otherwise non-interacting species. A preferred coupling agent comprises polysulphurized alkoxysilane, which is capable of facilitating stable interaction between the diene elastomer matrix and inorganic filler derived from silica and/or alumina. A particularly preferred polysulphurized alkoxysilane is bis(triethoxysilylpropyl) tetrasulphide, which is commercially available in a form supported 50% by weight on carbon black by Degussa under the trade name X50S.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Processing

The inventive tire tread composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art. Most preferably, the polymers are mixed first at 110 to 130° C. for 30 seconds to 2 minutes, followed by addition of the silica, silica coupler and other ingredients, the combination of which is further mixed, most preferably at an increasing temperature up to 140 to 160° C. for 30 seconds to 3 or 4 minutes. Most desirably the silica is mixed in portions, most preferably one half, then the second half.

Static Mechanical Properties

Tire tread compositions formed from the functionalized resins of the present invention exhibit superior static mechanical properties measured via stress/strain analysis in accordance with ISO 37:2011, indicating improved durability.

Preferably, the storage modulus (G') at 300% strain of the tire tread composition is greater than 1000 psi, more preferably greater than 1200 psi, most preferably greater than 1300 psi.

Preferably, the ultimate tensile strength of the tire tread composition is greater than 1500 psi, more preferably greater than 1700 psi, most preferably greater than 1900 psi.

Preferably, the ultimate elongation of the tire tread composition is greater than 300%, more preferably greater than 400%, most preferably greater than 450%.

Extractability

Tire tread compositions formed from the functionalized resins of the present invention exhibit less susceptibility to extraction of un-crosslinked material, indicating improved longevity of the resin matrix.

Preferably, the percentage of un-crosslinked material extracted from the tire tread composition after exposure to cyclohexane for 24 hrs is less than 40%, more preferably less than 30%, most preferably less than 20%.

Dynamic Mechanical Properties

Tire tread compositions formed from the functionalized resins of the present invention exhibit superior dynamic mechanical properties measured via dynamic mechanical analysis (DMA) at 100° C. in accordance with ASTM D7605, indicating improved durability, traction, and handling.

Preferably, the storage modulus (G') at 14% strain is greater than 125 kPa, more preferably greater than 150 kPa, more preferably greater than 175 kPa, most preferably greater than 190 kPa.

Preferably, the storage modulus (G') at 45% strain is greater than 100 kPa, more preferably greater than 125 kPa, more preferably greater than 150 kPa, most preferably greater than 170 kPa.

Preferably, the tan delta at 14% strain is greater than 100, more preferably greater than 125, more preferably greater than 150, most preferably greater than 165.

FIG. 1 depicts the tan delta at 4% strain over a temperature range from 20-120° C. for inventive material (DCPD-F) and comparative material (DCPD-H2). This FIGURE demonstrates the improved broad tan delta transition exhibited by the inventive material over the comparative material at high temperatures correlating to the temperature range where high performance tires operate during hard driving.

EXAMPLES

The ruthenium catalyst used in Example 1 is 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride.

Example 1. (Preparation of DCPD-F)

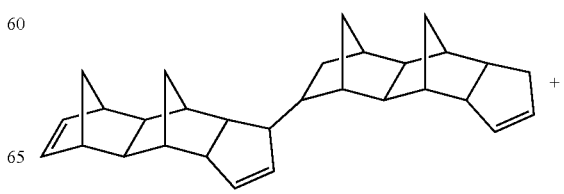

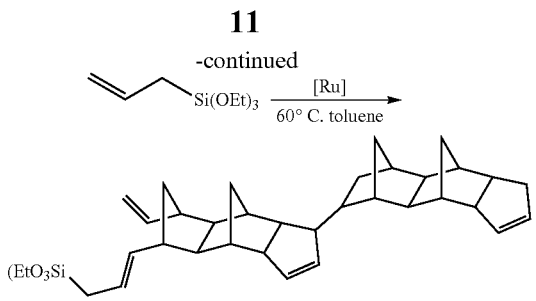

In the glove box a 250 mL round-bottomed flask was charged with Escorez™ E8400 resin (30 g), toluene (150 mL), and a stirbar. With stirring, the solution was heated to 60° C. After all of the resin had dissolved, allyl triethoxysilane (64 mL) was added, followed by the ruthenium catalyst (1.7 g). After stirring at 60° C. for 18 h, the mixture was cooled to room temperature and volatiles were removed under a flow of nitrogen.

Example 2. (Preparation of Tire Tread Compositions $C_1$-$C_5$ & $E_1$-$E_2$)

Comparative tire tread compositions $C_1$-$C_5$ and inventive tire tread compositions $E_1$-$E_2$ were obtained by first mixing 40 PHR of the resin type shown in Table 1 with the ingredients listed in Table 2 (all amounts given in PHR) in a Banbury™ mixer.

This first mix cycle was as follows: 1) mixer rotor speed was set at 25 RPM, temperature at 120° C.; 2) add polymers and mix for 30 seconds; 3) add half of the total amount of silica and mix for 5 minutes and 30 seconds; 4) ramp mixer rotor speed to 152 RPM; 5) add the remainder of the silica and all other ingredients and mix for 1 minute and thirty seconds; and 6) remove batch at a batch temperature with the range from 151-153° C. for a total mixing time of seven minutes and thirty seconds from the addition of the polymers.

The resulting compounds were cooled and then blended using the same Banbury™ mixer with curatives in the amounts shown in Table 3 (all amounts given in PHR). This second pass was performed as follows: 1) mixer rotor speed was set at 35 RPM, temperature at 70° C.; 2) add compound from first pass and mix for 30 seconds; 3) add curatives and mix for six minutes and 30 seconds; and 4) remove batch for a total mixing time of seven minutes from the addition of the compound.

TABLE 3

|  | C1 | C2 | E1 | E2 | C3 | C4 | C5 |
|---|---|---|---|---|---|---|---|
| Stearic acid | 2.5 | 2.5 | 2.5 | 2.5 | 2.5 | 2.5 | 2.5 |
| Zinc oxide | 2.5 | 2.5 | 2.5 | 2.5 | 2.5 | 2.5 | 2.5 |
| Sulfur (crosslinking agent) | 1.4 | 1.4 | 1.4 | 1.26 | 1.4 | 1.4 | 1.4 |
| Santocure™ CBS (rubber accelerator) | 1.7 | 1.7 | 1.7 | 1.53 | 1.7 | 1.7 | 1.7 |
| Perkacit™ DPG (rubber accelerator) | 2 | 2 | 2 | 1.8 | 2 | 2 | 2 |

Example 3. (Static Mechanical Properties of C1-C5 & E1-E2)

To determine static mechanical stress/strain properties (tensile strength, elongation at break, modulus values) of the comparative and inventive materials, compositions C1-C5 and E1-E2 were first compression molded and cured into plaques at 160° C. for 5 minutes, corresponding to t90+ appropriate mold lag time. Dog-bone shaped samples were died out of these plaques using British std. dies (type 2). Stress/strain measurements were then performed in accordance with ISO 37:2011.

The results of these stress/strain measurements are summarized in Table 4.

TABLE 1

|  | C1 | C2 | E1 | E2 | C3 | C4 | C5 |
|---|---|---|---|---|---|---|---|
| Resin Type | DCPD-H2 | DCPD-H2 | DCPD-F | DCPD-F | Terpene-phenol | C$_9$ | Coumarone-indene |
| Trade Name | Escorez™ 5415 | Escorez™ 5415 | — | — | Syvares™ TP-115 | Norsolene™ S-155 | Novares™ C 160 |

TABLE 2

| Ingredient | Trade Name | C1 | C2 | E1 | E2 | C3 | C4 | C5 |
|---|---|---|---|---|---|---|---|---|
| Styrene-butadiene rubber (elastomer) | Buna™ VSL 5025-2 | 60 | 60 | 60 | 60 | 60 | 60 | 60 |
| Silica (filler) | Zeosil™ Z1165 | 80 | 80 | 80 | 80 | 80 | 80 | 80 |
| Polybutadiene (elastomer) | Taktene™ 1203 | 40 | 40 | 40 | 40 | 40 | 40 | 40 |
| Polysulphurized alkoxysilane supported on carbon black (coupling agent) | Degussa X50S | 11.2 | 11.2 | 11.2 | 11.2 | 11.2 | 11.2 | 11.2 |
| naphthenic oil | Nytex™ 4700 | 15 | 15 | 15 | 15 | 15 | 15 | 15 |
| Antioxidant | Santoflex™ 6PPD | 2 | 2 | 2 | 2 | 2 | 2 | 2 |

TABLE 4

| | C1 | C2 | E1 | E2 | C3 | C4 | C5 |
|---|---|---|---|---|---|---|---|
| G' at 300% (psi) | 1107 | 1083 | 1447 | 1302 | 840 | 947 | 1281 |
| Ultimate tensile strength (psi) | 2058 | 2227 | 1789 | 1967 | 2197 | 2098 | 2016 |
| Ultimate elongation (%) | 476 | 530 | 379 | 464 | 606 | 561 | 447 |

Inventive materials E1 and E2 show a larger modulus at 300% than the comparative materials, demonstrating improved durability.

Example 4. (Extractability of C1-C5 & E1-E2)

The extractability of un-crosslinked material (e.g., low molecular polymers, antioxidants, cure fragments, oils, waxes, resin) from compositions C1-C5 and E1-E2 were determined by exposing each composition to a cyclohexane solvent for 24 hours and subsequently measuring the amount of free low molecular material leeched from the resin matrix. The results from an average of two extractability tests of the inventive and comparative tire tread compositions are summarized in Table 5.

TABLE 5

| | C1 | C2 | E1 | E2 | C3 | C4 | C5 |
|---|---|---|---|---|---|---|---|
| Extractions (% of un-crosslinked material removed) | 24.9 | 26.1 | 15.2 | 15.2 | 25.9 | 25.7 | 25.0 |

Inventive materials E1 and E2 show a much reduced level of extractions than the comparative materials, indicating increased longevity and permanency of the resin matrix. Without wishing to be bound by theory, it is believed that the improved (i.e., reduced) extractability of E1 and E2 results from the functionalized material of this composition allowing covalent bond formation between the resin matrix and silica.

Example 5. (Dynamic Mechanical Properties of C1-C5 & E1-E2)

The dynamic mechanical properties of C1-C5 & E1-E2 were measured via dynamic mechanical analysis (DMA) at 100° C. in accordance with ASTM D7605.

The dynamic mechanical properties of the inventive and comparative materials are summarized in Table 6.

TABLE 6

| | C1 | C2 | E1 | E2 | C3 | C4 | C5 |
|---|---|---|---|---|---|---|---|
| G' at 14% (psi) | 100 | 100 | 207 | 195 | 99 | 95 | 140 |
| tan delta at 14% | 100 | 101 | 167 | 170 | 113 | 145 | 168 |
| G' at 45% (psi) | 100 | 100 | 185 | 171 | 94 | 92 | 126 |

Inventive materials E1 and E2 show a large G' at 14%, tan delta at 14%, and G' at 45%, demonstrating improved durability, traction, and handling over the comparative materials.

The invention claimed is:

1. A reaction product obtained by contacting a polymer comprising units derived from dicyclopentadiene (DCPD) with a vinyl monomer or vinylene monomer, wherein the vinyl monomer or vinylene monomer is represented by one of the following formulae:

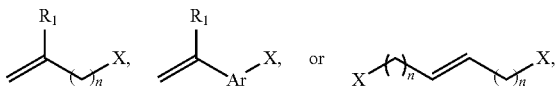

wherein,
each X is, independently, $-SiR_2R_3R_4$, $-O-SiR_2R_3R_4$, or $-Si(OR_2)(OR_3)(OR_4)$;
each $R_2$, $R_3$, and $R_4$ is, independently, a hydrogen, a $C_1$ to $C_{20}$ alkyl group, or an aromatic group;
each $R_1$ is, independently, a hydrogen atom or a $C_1$ to $C_{40}$ alkyl group;
each Ar is, independently, an aromatic group;
each n is, independently, from 0 to 40;
wherein the polymer comprising units derived from DCPD and the vinyl monomer or vinylene monomer are contacted in the presence of a metathesis catalyst; and
wherein the reaction product is used in a tire tread composition.

2. The reaction product of claim 1, wherein the catalyzed reaction product is subsequently hydrogenated.

3. The reaction product of claim 1, wherein the metathesis catalyst is a ruthenium catalyst.

4. The reaction product of claim 3, wherein the metathesis catalyst comprises tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride, [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, and fluoride and bromide derivatives thereof, or a mixture of any of the above.

5. A tire tread composition comprising the reaction product of claim 1.

6. The tire tread composition of claim 5, comprising:
   (i) the reaction product within the range from 5 to 100 PHR;
   (ii) 100 PHR of a diene elastomer; and
   (iii) an inorganic filler within the range from 50 to 150 PHR.

7. The tire tread composition of claim 6, comprising the reaction product within the range from 20 to 50 PHR.

8. The tire tread composition of claim 6, wherein the inorganic filler comprises silica.

9. The tire tread composition of claim 6, further comprising carbon black.

10. The tire tread composition of claim 6, further comprising a polysulphurized alkoxysilane coupling agent.

11. The tire tread composition of claim 6, wherein the composition is cured.

12. The tire tread composition of claim 11, wherein the diene elastomer is selected from the group consisting of butyl rubber, halogenated butyl rubber, branched ("star-branched") butyl rubber, halogenated star-branched butyl rubber, poly(isobutylene-co-p-methylstyrene), general purpose rubber, natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

13. The tire tread composition of claim 12, wherein the diene elastomer comprises a mixture of polybutadiene rubber and styrene-butadiene rubber.

* * * * *